United States Patent
Wilt et al.

(10) Patent No.: US 11,486,888 B2
(45) Date of Patent: Nov. 1, 2022

(54) SCANNING PLATEN WITH SAMPLE CONVEYOR

(71) Applicants: Robert R. Wilt, Chestertown, MD (US); Lou Faustini, Burtonsville, MD (US)

(72) Inventors: Robert R. Wilt, Chestertown, MD (US); Lou Faustini, Burtonsville, MD (US)

( * ) Notice: Subject to any disclaimer, the term of this patent is extended or adjusted under 35 U.S.C. 154(b) by 472 days.

(21) Appl. No.: 16/741,279

(22) Filed: Jan. 13, 2020

(65) Prior Publication Data
US 2020/0225253 A1    Jul. 16, 2020

Related U.S. Application Data

(60) Provisional application No. 62/791,418, filed on Jan. 11, 2019.

(51) Int. Cl.
*G01N 35/04*    (2006.01)
*G01N 15/02*    (2006.01)

(52) U.S. Cl.
CPC ............. *G01N 35/04* (2013.01); *G01N 15/02* (2013.01); *G01N 2035/0477* (2013.01)

(58) Field of Classification Search
CPC .................. G01N 35/04; G01N 15/02; G01N 2035/0477; G01N 21/3563; G01N 21/359; G01N 21/13; G01N 2015/0019
See application file for complete search history.

(56) References Cited

U.S. PATENT DOCUMENTS

| | | | |
|---|---|---|---|
| 7,865,035 B2 | 1/2011 | Bruins | |
| 2009/0066950 A1* | 3/2009 | Bruins | G01N 15/02 356/244 |

* cited by examiner

*Primary Examiner* — Jennifer Wecker
*Assistant Examiner* — Oyeleye Alexander Alabi
(74) *Attorney, Agent, or Firm* — Royal W. Craig; Gordon Feinblatt LLC

(57) ABSTRACT

An improved sample conveyer for articulating a sample across the flat platen of a spectrum analyzer relative to a scan window in the platen. The conveyor includes a sample truck configured for movement across the surface of the platen, the sample truck having a scan aperture. A spur gear is rotatably mounted about the aperture, and a drive gear is engaged to the spur gear. The drive gear has a plurality of magnets embedded therein, and a second plurality of magnets is affixed to the sample truck. A translation mechanism resides beneath the platen which includes a sled mounted on parallel rails for linear translation there along, and a motor mounted on the sled. Magnets on both the sled and drive gear index and engage corresponding magnets on the sample truck to implement complex orbital, hypotrochoid or epitrochoid scan patterns for more accurate particulate analysis.

20 Claims, 4 Drawing Sheets

SCANNING PLATEN WITH SAMPLE CONVEYOR

CROSS-REFERENCE TO RELATED APPLICATIONS(S)

The present application derives priority from U.S. provisional application No. 62/791,418 filed 11 Jan. 2019.

BACKGROUND OF THE INVENTION

1. Field of the Invention

The present invention relates generally to conveyor mechanisms for articulating a sample relative to an optical scan window.

2. Description of the Background

Many agricultural and food production operations rely on spectroscopic analysis to test materials with radiated energy, and there are many different variations of spectroscopic analyzers on the market today. Near-infrared (NIR) spectroscopy has greatly simplified and improved the speed of analysis for quality testing of grains, flours and beans. The use of near-infrared spectroscopy has led to higher sample throughput by replacing multiple time-consuming and complicated chemical techniques. Using NIR spectroscopy it is possible to non-destructively analyze inhomogeneous samples for moisture, protein, oil and many other parameters in less than one minute at all stages of production: grading, milling, oil extraction and final product quality verification. In most large scale operations such as grain processing, representative samples of the product are tested at predetermined intervals. Commercial grain analyzers suitable for this purpose in grain production operations are readily available. Of these, some are transmission-mode analyzers that test the whole grain. Others are reflectance-mode analyzers that typically test ground grain (though reflectance-mode analyzers are also suitable for some whole grains, flour, feeds, forages etc.). In both cases a sample of the grain to be analyzed is irradiated with diffracted and filtered light at swept wavelengths. The swept wavelengths are of known value in determining the percentage concentration of measured constituents.

Both transmission-mode and reflectance-mode analyzers use sample containers to hold the test sample. For example, an amount of grain will be deposited into a disc-shaped sample cup which has a transparent window, the sample cup is aligned with a scanning window on the spectrum analyzer, and measurements of radiation transmitted through or reflected from the grain via the window(s) is analyzed.

The presentation of the grain sample to the scanning window is critical to obtain an appropriate analysis, and so various sample holders and conveyors for the sample holder have been devised in order to carry out measurements at different locations on the sample. For example, U.S. Pat. No. 7,869,035 to Bruins issued Jan. 11, 2011 shows a sample table with a housing, top platen and inspection window through the platen, and a sub-surface magnetic drive ring inside the housing and encircling the inspection window so as not to obstruct light directed there through. The drive ring has magnets embedded in it, and is rotated by a motor-driven belt. The drive ring magnets interact with a sample cup sitting on the platen to rotate it. This configuration allows a rapid spectroscopic analysis of a food sample and is easy to clean because there are no exposed moving parts. However, there is no provision for linear positioning across the surface of the platen. Given samples of different sizes an optimal scan pattern entails a combination of linear and orbital translation defining a hypotrochoid or epitrochoid.

The invention achieves an optimal scan pattern by means of a scanning platen having a subsurface magnetic translation mechanism and an above-surface magnetically-driven sample vehicle that conveys a sample cup to a scanning window and articulates the sample about the scanning window linearly along one axis and/or by rotation, collectively enabling complex orbital hypotrochoid or epitrochoid scan patterns for particulate analysis.

SUMMARY OF THE INVENTION

Accordingly, it is an object of the present invention to provide an improved conveyor for implementing a complex scan pattern by a combination of linear and orbital translation.

This and other features and benefits are achieved with an improved conveyer for articulating a sample across the flat platen of a spectrum analyzer relative to a scan window on the platen. The conveyor includes a sample truck configured for movement across the surface of the platen. The sample truck is a flat member defined by an aperture. A spur gear is rotatably mounted in the aperture, and a drive gear is engaged to the spur gear. The drive gear has a plurality of magnets embedded therein, and a second plurality of magnets is affixed to the sample truck. A translation mechanism resides beneath the platen, the translation mechanism comprising a sled mounted on parallel rails for linear translation there along. The translation mechanism includes a servo motor for translating the sled along the rails, and a stepper motor mounted on the sled with a rotary paddle having an array of magnets attached thereto. The paddle magnetically engages and indexes rotation of the drive gear. A processor controls both motors.

In operation, the processor is programmed with a scan pattern that causes linear translation of the sled anywhere along the length of the platen, plus indexed rotation of the spur gear/sample, stopping at each scan, and collectively compiling complex orbital, hypotrochoid or epitrochoid scan patterns for more accurate particulate analysis.

For a more complete understanding of the invention, its objects and advantages, refer to the remaining specification and to the accompanying drawings.

BRIEF DESCRIPTION OF THE DRAWINGS

Other objects, features, and advantages of the present invention will become more apparent from the following detailed description of the preferred embodiment and certain modifications thereof, in which.

DETAILED DESCRIPTION OF THE PREFERRED EMBODIMENTS

Figure 1:
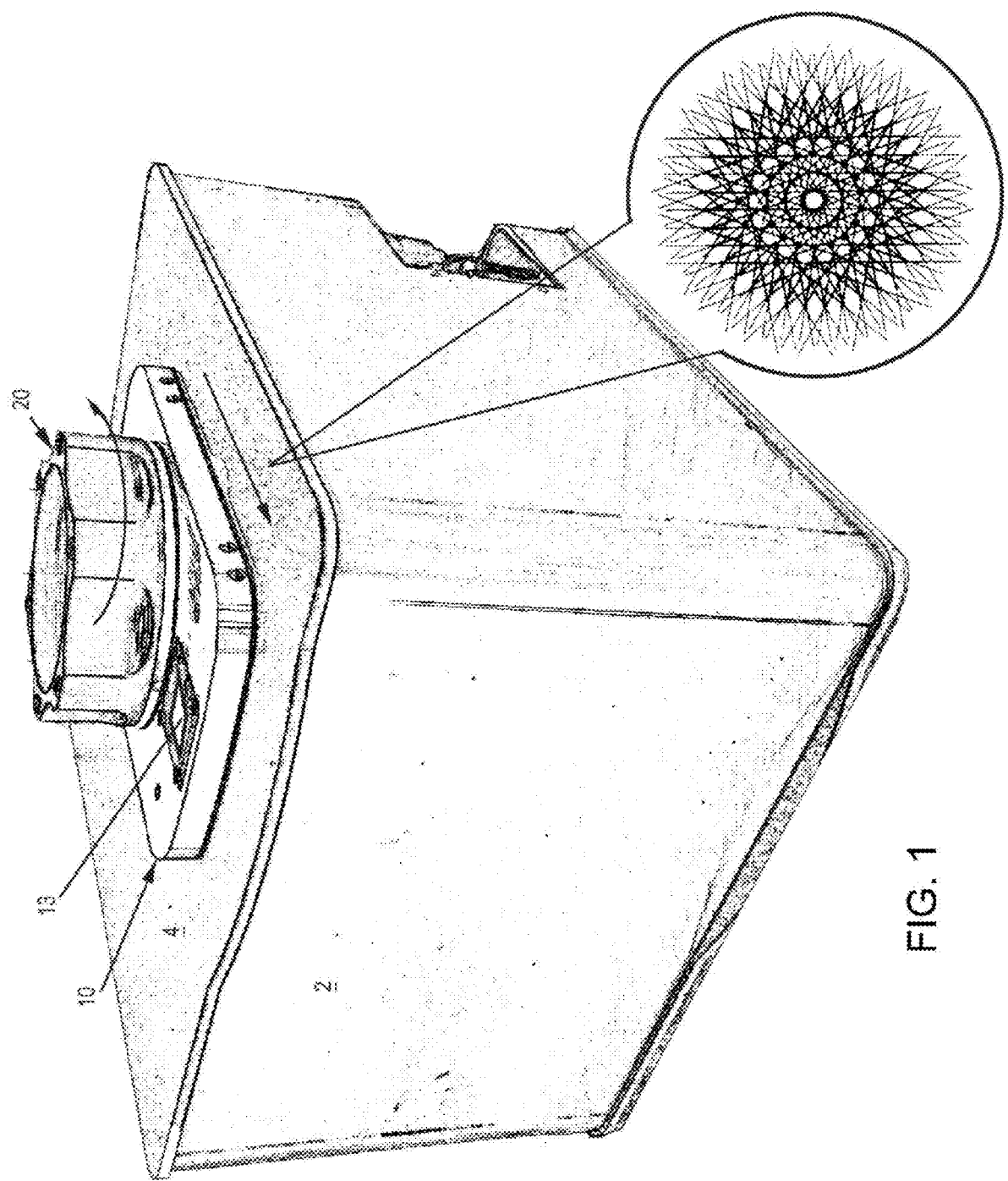
FIG. 1 is a top perspective view of a common Czerny-Turner monochromator 2 having top flat platen 4 and the improved conveyer 10 for articulating a sample across the flat platen 4 according to the invention.

FIG. 1 is a perspective view of an embodiment of a common Czerny-Turner monochromator employing the improved scanning platen 4 with sample conveyor 10 according to the present invention. The monochromator is enclosed within a housing 2 upon which the scanning platen 4 sits as the top surface. The scanning monochromator generally includes a known optical bench with a light source, entrance optics, a diffraction grating and slit/shutter assembly, and exit optics (obscured) for scanning wavelengths of light through a scanning window in platen 4 to a sample receptacle 20 contained within a conveyor 10. The diffraction grating disperses light by diffracting different wavelengths at different angles, and selected spectral components of the light emanate out through the scanning window beneath sample conveyor 10 and directly into a sample contained therein. The selected spectral component of the light emanating out through the scanning window is refracted off the sample in sample conveyor 10, back to a detector/detection system in the monochromator which measures the intensity of the diffusely reflected light from the sample, converting the light power to an electrical signal by which a quantitative analysis of any of a variety of characteristics of a sample, including constituent analysis, moisture content, taste, texture, viscosity, etc.

The invention achieves an optimal scan pattern shown at bottom right comprising a composite of scan points arrayed in a hypotrochoid or epitrochoid by a combination of linear and orbital translation. The high degree of automation and mechanical technique that achieves this also ensures consistent sample presentation, more efficient scanning, and more accurate scanning as a consequence.

The sample receptacle 20 has a round open-topped recess configured for insertion of a conventional sample puck containing a granular sample. The sample receptacle 20 is seated on conveyor 10, and conveyor 10 interfaces a subsurface magnetic translation mechanism below platen 4 to convey the sample puck to the scanning window and articulate the sample about the scanning window linearly along one axis and/or by rotation. Conveyor 10 also includes a built-in calibration reference 13 that can be conveyed to the scanning window for pre-scan calibration.

Figure 2:
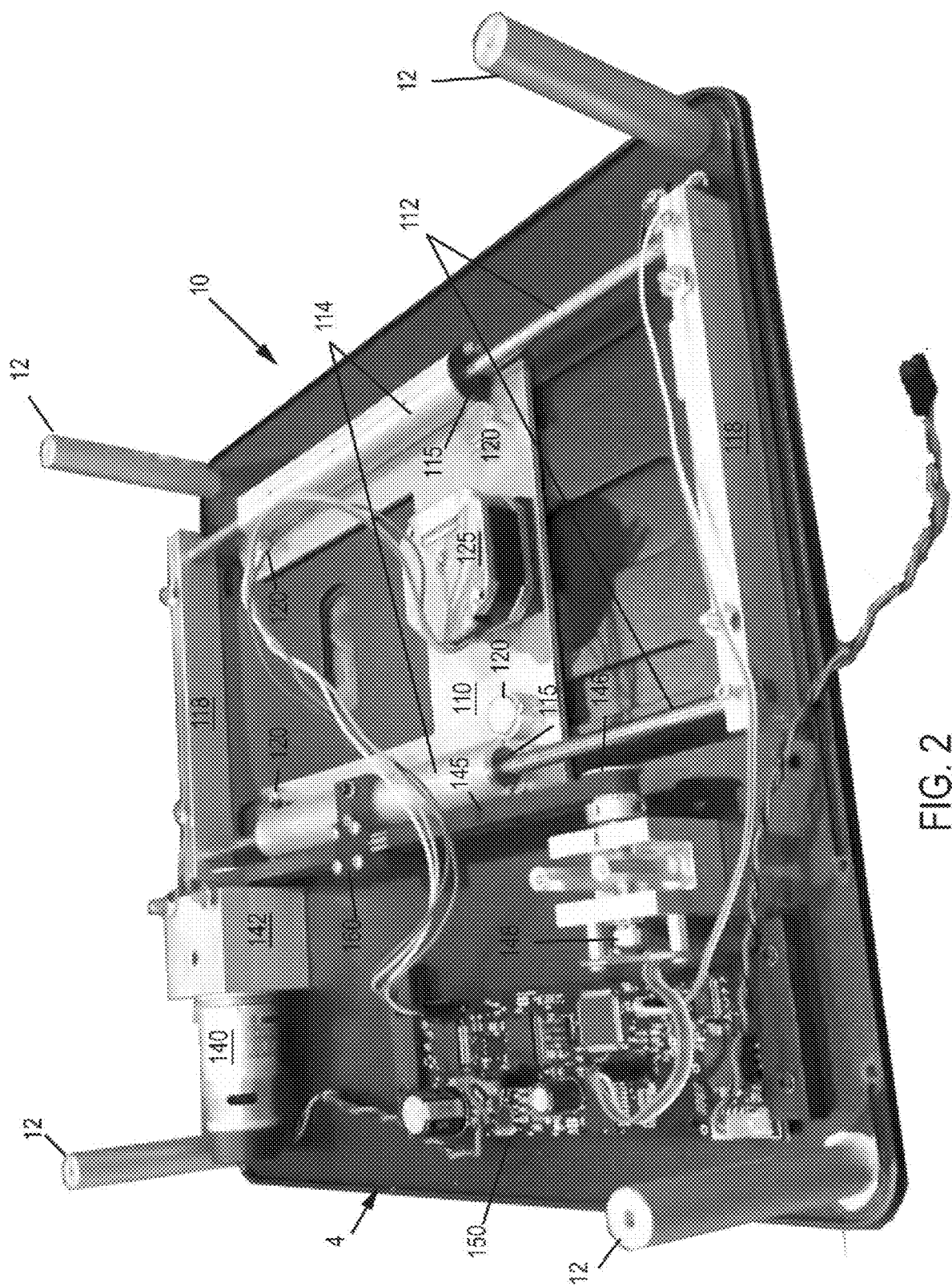
FIG. 2 is a perspective view of the inverted platen 4 which sits upon pylons 12 atop housing 2 (FIG. 1).

FIG. 2 is a perspective view of the inverted platen 4 which sits upon pylons 12 atop housing 2 (FIG. 1). The conveyor 10 generally includes a U-shaped sled 110 slidably mounted on a pair of parallel rails 112. To ensure substantially frictionless smooth sliding, the sled 110 bears a corner pair of tubular runners 114 each further comprising a cylindrical tube having a sliding self-lubricated (PTFE-impregnated) ball bearing 115 mounted at each end through which rails 112 pass. The rails 112 are mounted to and straddle a pair of opposing end brackets 118 which limit the degree of linear sliding freedom of sled 110 there between. The sled carries a plurality of magnets 120 (preferably four magnets 120) which index the position of conveyor 10 atop platen 4 by magnetic attraction. The sled 110 also carries a stepper motor 125 with an upwardly-disposed rotor axle protruding through sled 110. A rotating rotary square 175 (obscured in FIG. 2, see FIG. 4) is mounted on the rotor and this carries a checkerboard array of magnets 120 (e.g, eight magnets 120) which index the rotation of the sample receptacle 20 within the carriage 10 atop platen 4 by magnetic attraction. The combination of linear translation of carriage 10 vis a vis magnetic coupling with sled 110 which is articulated along rails 112 plus rotation of sample receptacle 20 within carriage 10 all by magnetic attraction makes it possible to program an optimal scan pattern in complex hypotrochoids or epitrochoids for more accurate particulate analysis. To reduce electromechanical vibrations, the sled 110 is indirectly driven by a servo motor 140 turning a toothed belt 145 through a damping transmission 142. The damping transmission 142 comprises a toothed pulley (obscured) supported in a resilient medium such as silicone contained within the housing of transmission 142, though one skilled in the art will understand that a variety of other suitable damping transmissions 142 may be used. The toothed pulley of transmission 142 engages belt 145 which is looped about a return wheel 146 mounted at the other end of rails 112. The return wheel 146 is engaged to an encoder 148 for positional feedback, and both the encoder 148 and servo motor 140 are in communication with a processor board 150 for microstep positioning of sled 110. The toothed belt 145 is attached to the most proximate tubular runner 114 by a flexible clamp 160, and the combination of the flexible clamp 160, belt drive 145 and floating transmission 142 protect the sled from vibration or irregular movement.

Processor board 150 may be a commercially-available two-axis motor controller/driver module capable of supporting a bi-phase bipolar stepper motor 125, a variety of which are commercially available. For example, a VEXTA® PK243 stepper motor 125 paired with a Trinamic® TMCM-3110 stepper motor drive will suffice. In this embodiment processor board 150 controls both stepper motor 125 and servo 140.

Figure 3:
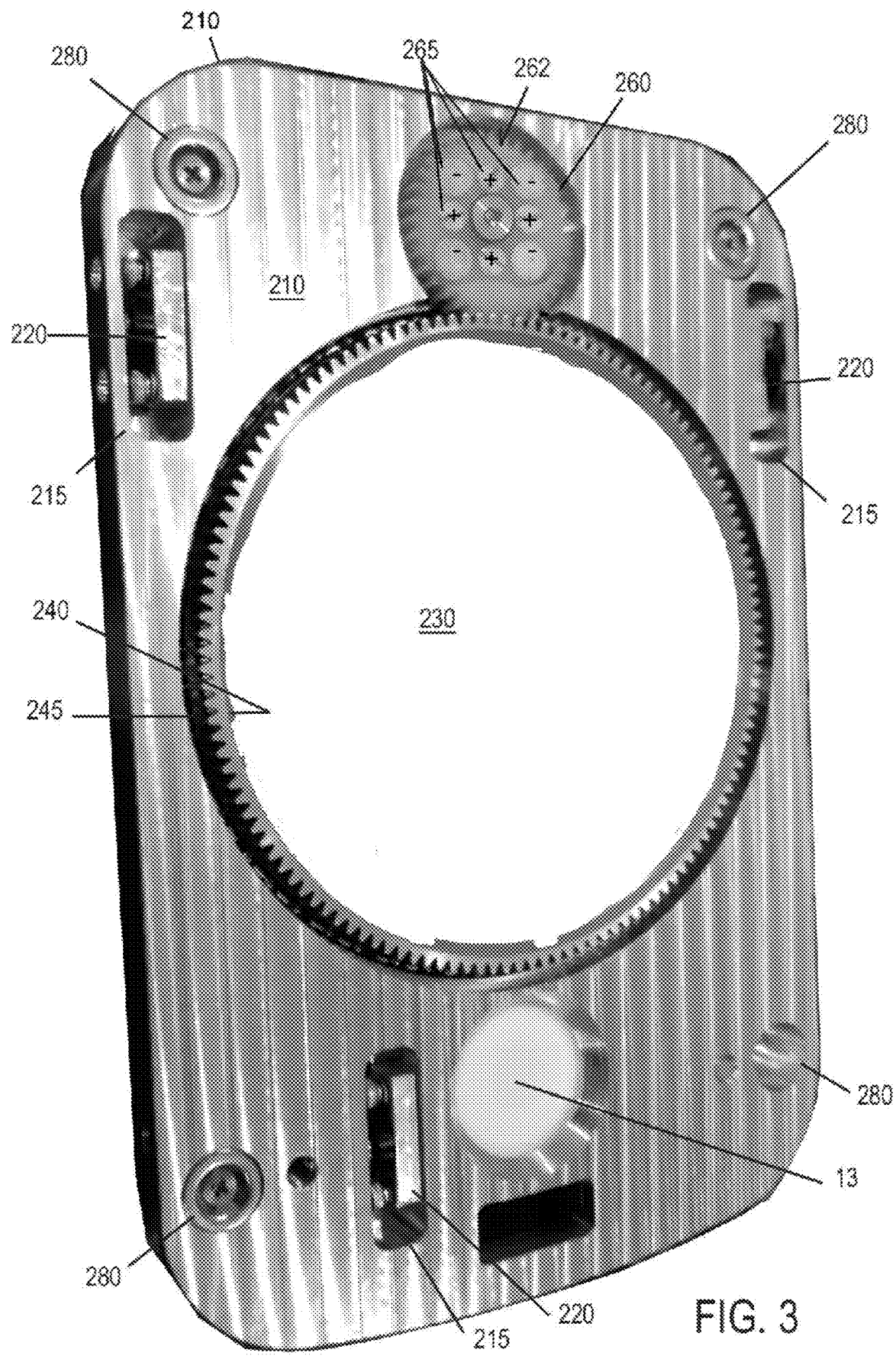
FIG. 3 is a close-up view of the underside of conveyor 10 which slides atop platen 4 to convey the sample cup 20 to the scanning window.

FIG. 3 is a close-up view of the underside of conveyor 10 which slides atop platen 4 to convey the sample cup 20 to the scanning window. Conveyor 10 comprises a two-part support member 210 that screws together, one part (the underside) presenting a smooth-surface. The support member underside is machined with a plurality of recesses to accommodate functional features. More specifically, the support member 210 underside is machined with a plurality (three) recesses 215 to accommodate three sets of rollers 220 for frictionless sliding across platen 4. Each roller 220 includes a strut bearing a single plastic miniature roller, the struts and roller being flush inside recesses 215 and affixed therein by a pair of screws. All three rollers 220 are aligned along parallel axes. Both sides of the two-part support member 210 are machined with a circular central aperture 230 that presents the sample in sample cup 20 to the scan window. The central aperture 230 is rimmed by a rotating spur gear 240 journaled into a ring bearing 245 that is sandwiched between the opposing parts of the support member 210. The spur gear 240 has outwardly disposed teeth that are engaged to a drive gear 260, drive gear 260 also being flush inside a recess 262 and rotatably affixed to support member 230. The sample cup 20 seats inside the spur gear 240 and co-rotates therewith. The drive gear 260 includes an array of magnets 265 embedded or recessed therein, for example a patterned (e.g., checkerboard) array of magnets 265 of alternating polarities. Magnets 265 magnetically engage the checkerboard array of magnets 120 mounted on the rotor of stepper motor 125. This way, stepper motor 125 indexes the rotation of drive gear 260, spur gear 240, and the sample receptacle 20 within the carriage 10 all by magnetic attraction. Also, the support member 210 underside is machined with a plurality (four) recesses for four corner-mounted magnets 280 that magnetically-engage corresponding magnets 120 on sled 110 to index the conveyor 10 to sled 110.

Figure 4:
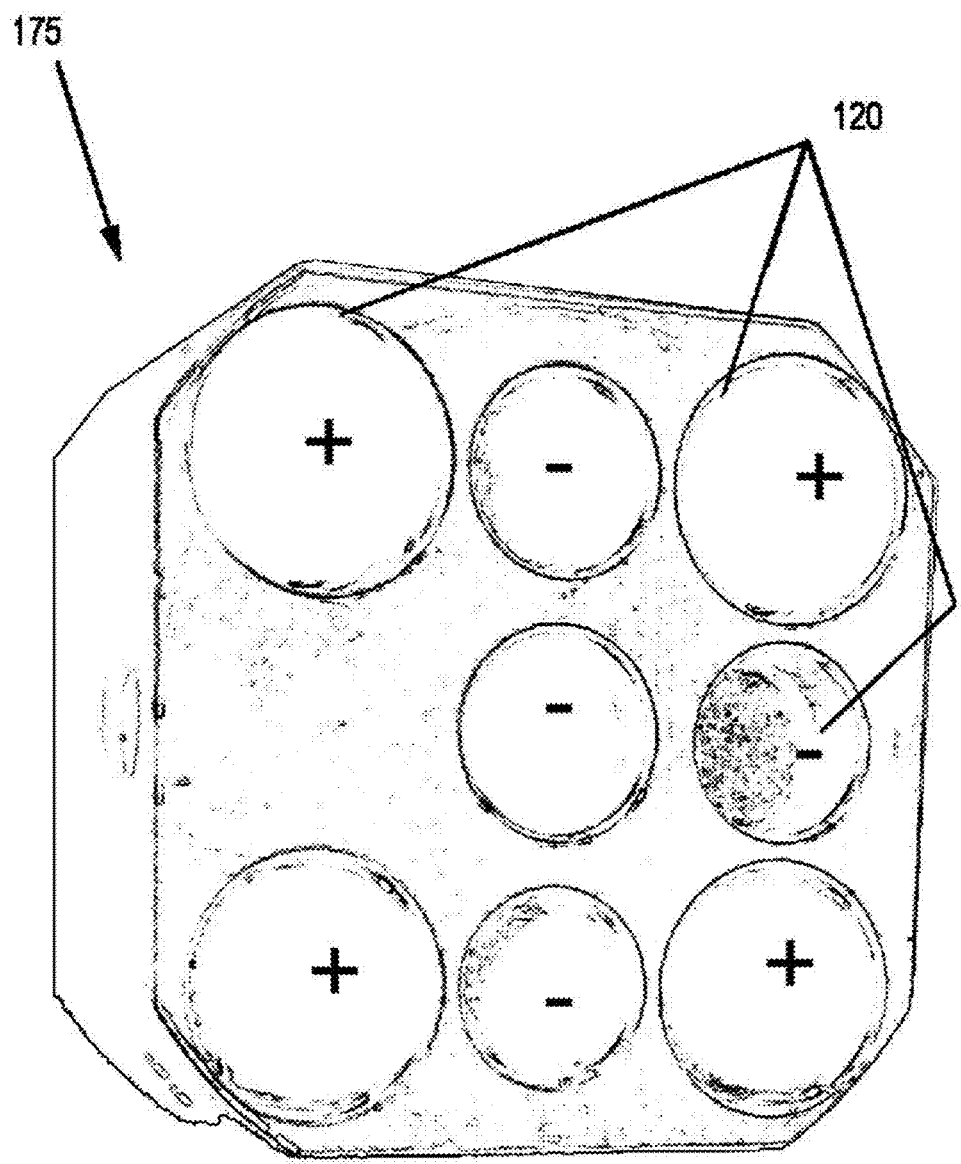
FIG. 4 is a frontal view of an exemplary rotary square 175.

FIG. 4 is a frontal view of an exemplary rotary square 175 mounted on the rotor of stepper motor 125 (FIG. 2) with its checkerboard array of magnets 120 (e.g, eight magnets 120) which index the rotation of the sample receptacle 20 within the carriage 10 atop platen 4 by magnetic attraction.

In operation, processor board 150 is programmed to carry out a scan pattern that causes servo motor 140 to turn transmission 142 to move belt 145 to position sled 110 anywhere along the length of platen 4 of FIG. 1. Typically, the scan pattern will include initial scans of calibration reference 13 and so sled 110 is positioned accordingly with reference 13 over the scan window. The processor board 150 then proceeds with a pattern scan conveying a sample cup to the scanning window atop platen 4 and articulating the sample about the scanning window linearly along one axis and/or by rotation, stopping at each scan, and collectively compiling complex orbital, hypotrochoid or epitrochoid scan patterns for more accurate particulate analysis. For rotation the stepper motor 125 indexes the rotation of drive gear 260, which drives spur gear 240, and the sample receptacle 20 within the carriage 10 all by magnetic attraction. Similarly, for translation the servo motor 140 drives belt 145 to move sled 110 along rails 112 which magnetically engages carriage 10 by magnets 280 to move the conveyor 10 linearly.

It should now be apparent that the above-described system is a more efficient and less error-prone conveyor for scanning whole or partial grain, particulates or the like that allows a human operator to prepare sample pucks, scan them, and track the entire process quickly and efficiently on an as-needed basis.

Although described herein with reference to a process of feeding sample into a spectrum analyzer, it should be understood that the inventive device may be used in any industrial, agricultural, or commercial process requiring the combination of linear and rotary translation of a sample relative to a point on a platen.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A conveyer for articulating a sample across a spectrum analyzer platen relative to a scan window thereon, comprising:
   a sample truck configured for conveying a scan sample across said platen, said sample truck being defined by an aperture having a spur gear rotatably seated therein, a drive gear rotatably engaged to said spur gear, a first plurality of magnets affixed to said sample truck, and a second plurality of magnets attached to said drive gear;
   a translation mechanism beneath said platen, said translation mechanism comprising an articulating sled mounted on parallel rails for linear translation there along;
   a first motor configured for linear translation of the articulating sled, a second motor mounted on the sled, a rotary member mounted on the second motor, said rotary member having a third plurality of magnets affixed thereto, and wherein said third plurality of magnets are configured to magnetically engage the second plurality of magnets affixed to said drive gear and index rotation of the drive gear and said rotary member in order to provide rotation of said spur gear from the second motor mounted on the articulating sled; and a processor configured to control said first motor and second motor.

2. The conveyer according to claim 1, wherein said sample truck is configured for seating an interchangeable sample puck containing a scan sample.

3. The conveyer according to claim 1, wherein said sample truck is defined by a circular aperture.

4. The conveyer according to claim 1, wherein said sample truck comprises a plurality of linearly-aligned rollers.

5. The conveyer according to claim 4, wherein said plurality of linearly-aligned rollers are recessed in said sample truck.

6. The conveyer according to claim 1, wherein said first motor is coupled to said sled by a pulley.

7. The conveyer according to claim 1, wherein said first motor is coupled to said sled by a damped transmission.

8. The conveyer according to claim 1, wherein said first motor is a servo motor for translating the sled along the rails.

9. The conveyer according to claim 1, wherein said second motor is a stepper motor.

10. The conveyer according to claim 1, wherein said second plurality of magnets attached to said drive gear are arranged in a square pattern of alternating polarities.

11. An apparatus for translating a sample across a platen of a spectrum analyzer relative to a scan window in said platen, comprising:
    a sample truck configured for translation across one side of the platen, said sample truck comprising a body having an aperture there though, a spur gear rotatably mounted in the aperture, a drive gear engaged to the spur gear, a first plurality of magnets affixed to said drive gear, and a second plurality of magnets affixed to the sample truck;
    a translation mechanism residing on another side of the platen, the translation mechanism comprising an articulating sled, a first motor configured for linear translation of the sled, a second motor mounted on the sled, a rotary paddle mounted on the second motor, said rotary paddle having an array of magnets affixed thereto; wherein the array of magnets affixed to said rotary paddle are configured to magnetically engage the first plurality of magnets affixed to said drive gear and index rotation of the drive gear, in order to provide rotation of said second motor mounted on the articulating sled;
    whereby controlled linear translation of the articulating sled along the platen combined with rotation of the spur gear and sample is configured to allows orbital, hypotrochoid and epitrochoid scan patterns.

12. The conveyer according to claim 11, wherein said sample truck is configured for seating a sample puck containing said scan sample.

13. The conveyer according to claim 11, wherein said sample truck is defined by a circular aperture.

14. The conveyer according to claim 11, wherein said sample truck comprises a plurality of linearly-aligned rollers.

15. The conveyer according to claim 14, wherein said plurality of linearly-aligned rollers are recessed in said sample truck.

16. The conveyer according to claim 11, wherein said first motor is coupled to said sled by a pulley.

17. The conveyer according to claim 11, wherein said first motor is coupled to said sled by a damped transmission.

18. The conveyer according to claim 11, wherein said first motor is a servo motor for translating the sled along the rails.

19. The conveyer according to claim 11, wherein said second motor is a stepper motor.

20. The conveyer according to claim 11, wherein said second plurality of magnets attached to said drive gear are arranged in a square pattern of alternating polarities.

* * * * *